Jan. 13, 1942.  A. MAURER  2,270,133
CHAIN DRIVE
Filed July 27, 1939
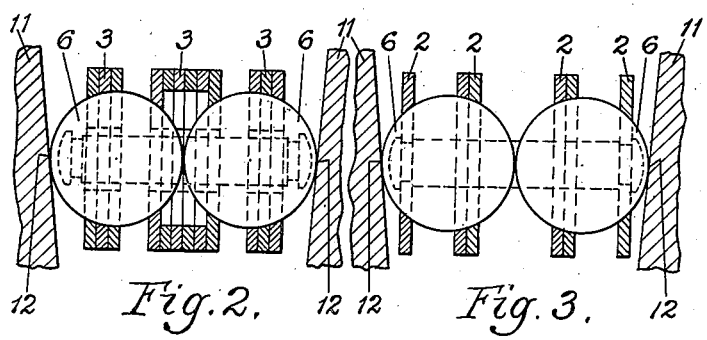
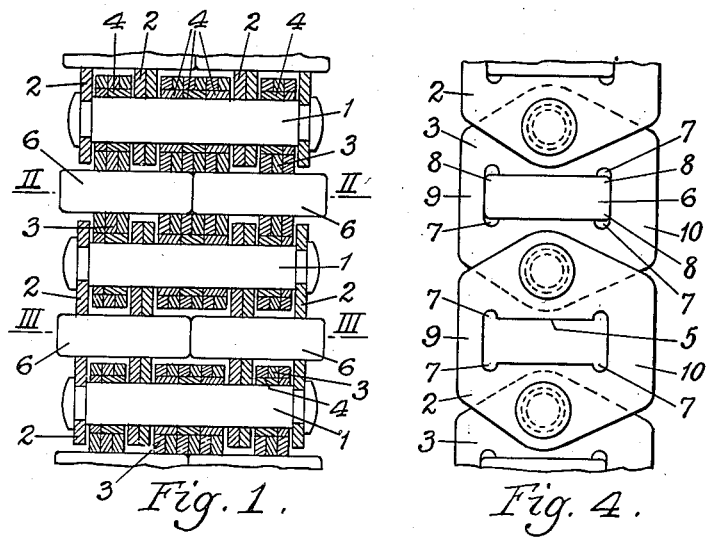
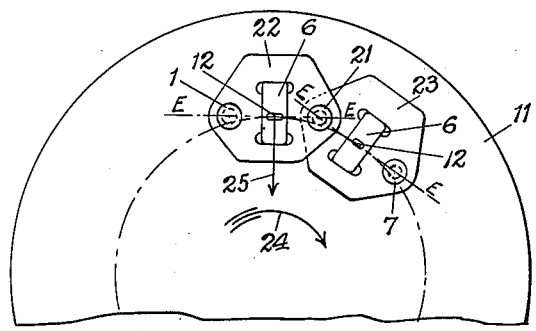
Inventor.
Albrecht Maurer.
by Arthur Carter
Attorneys.

Patented Jan. 13, 1942

2,270,133

UNITED STATES PATENT OFFICE 2,270,133

CHAIN DRIVE

Albrecht Maurer, Bad Homburg, vor der Hohe, Germany, assignor to Link-Belt Company, Chicago, Ill., a corporation of Illinois Application July 27, 1939, Serial No. 286,881
In Germany July 30, 1938

8 Claims. (Cl. 74—235)

For chain drives with conical sheaves placed opposite to and displaceable relatively to each other, metal chains with a plurality of link bars are known which in each link exhibit a pair of transmission means which transmit the lateral pressure to each other, are guided cage-like in recesses of the tension link bars, and are mounted rollably in the radial direction. In connection therewith, alternate links may be provided with unequal numbers of tension link bars. These metal chains exhibit various disadvantages which limit their applicability for extremely long-continued performance.

Previous designs of chains show a rather great length for the individual links, and therefore a large chain subdivision, resulting in an unfavorable relation between the carrying length of the transmission means and the subdivision. On the length of the link depends the number of pairs of transmission means in simultaneous engagement with the conical sheaves, likewise the impact velocity of the transmission means on the conical sheaves. The greater the chain subdivision, the smaller the number of simultaneously bearing links and consequently the transmissible circumferential force (for a given loading of an individual link), and the greater also the impact velocity, whose magnitude is an unfavorable factor affecting the efficiency and limiting the speed of the chain.

The long chain links also have a large weight relatively to the carrying length of the transmission means and to the wearing surface of the connecting bolts.

To these circumstances unfavorably affecting the efficiency and limiting the transmitting capacity, and resulting from the large chain subdivision, must be added the heat of friction generated by the rolling in and out of the pair of transmission means of each link on the conical driving sheaves.

The purpose of the invention is to increase the transmitting capacity and the efficiency by indicating means whereby the chain subdivision and the weight of the chain may be diminished and the heat of friction may be reduced.

The chain subdivision is substantially equal to the sum of the diameter of the connecting bolt, the length of the transmission means (measured along the chain), and the thickness of the walls of the eyes of the tension link bars surrounding the connection bolts.

According to the invention, a diminution of the connecting bolt diameter is effected—when unequal numbers of tension link bars are used in adjacent links—by having the tension link bars of the links with the smaller number of bars set rigidly on the connecting bolts, and providing the tension link bars of the links with the greater number of bars with hardened joint bushings. The numbers of bars in the respective links may be so chosen that the total section of rupture of the two kinds of links shall be at least approximately equal, because the fixed tension link bars, while less numerous, but without bushings, have thicker walls in the eyes surrounding the connection bolts, than do the more numerous bushed bars in which the wall thickness about the eyes is diminished by the amount of the wall thickness of the bushings.

This type of construction makes it possible to greatly diminish the number of the fixed tension link bars, and thus to increase the total breadth of the tension link bars which are rotatably mounted on the connection bolts by means of joint bushings, whereby then the bearing pressures of the bushings on the connection bolts is diminished, so that the bushings can be made thinner for a given transmission force.

At the same time there is effected a saving in weight, and the wearing surface of the connection bolts is increased.

A diminution of the length of the transmission means is also possible without diminishing their carrying length. Heretofore the rollers used as transmission means have presented very much rounded edges, making them much longer than their bearing length. A lesser rounding of the edges, which would have entailed a shortening of the total length of the roller while maintaining its bearing length, has been precluded by reason of the heavy stress concentrations which would have been produced at the corners of the substantially rectangular recesses in the tension link bars which receive the rollers.

The invention supplies a remedy in that, in connection with the use of narrow rollers, possibly only slightly rounded at the edges, the recesses in the tension link bars have rounded cutouts at the ends of their long sides, for the prevention of stress concentrations at the re-entrant corners. There results a diminution of the chain subdivision and of the weight. Moreover the rounded cut-outs, particularly when there is heavy axial tension in the chain, bring about a diminution of the friction of the rollers on the tension link bars which is generated by the rolling in and out, since the sliding surfaces on the heads of the rollers are removed where the diameter is greatest, making a smaller effective radius of friction.

The rounded cut-outs in the corners of the recesses of the tension link bars bring about a uniform distribution of tensile stresses in the longitudinal strips bounding the recesses along their short sides, so that these strips can be made narrower than formerly. Since however the outer strips must resist, in addition to the longitudinal tension, the transverse radially-outward-acting forces due to the pressure of the conical sheaves on the rollers, this measure is not thus effective in their case. Accordingly the invention provides for making the inner longitudinal strips, which are turned toward the axes of the conical sheaves, narrower than the outer longitudinal strips. This again allows a further dimunition of weight.

A final contribution to the accomplishment of the intended purpose is made by the expedient of having the plane determined by the axes of the two connection bolts of the link cut through the areas of contact of the rollers with the conical sheaves. This brings it about that every pair of rollers rolls in and out perfectly radially between the conical sheaves without any sliding.

In the drawing an embodiment of the subject of the invention is shown by way of examples.

Figure 1 is a longitudinal section through a portion of chain;

Figure 2 is a cross section on the line II—II;

Figure 3 is a cross section on the line III—IIII of Figure 1, including parts of the conical sheaves between which the chain runs;

Figure 4 is a side view corresponding to Figure 1, with the rollers omitted in one link in order to show more clearly the recesses of the tension link bars.

Figure 5 is a side view of two links of the chain in their position between the conical sheaves.

The chain exhibits connection bolts 1, on which tension link bars 2 are secured rigidly and tension link bars 3 are placed rotatably with joint bushings 4. The more numerous tension link bars 3 are so disposed between the tension link bars 2 that there is a bar 2 at each outer extreme, so that the links composed of fixed bars 2 are broader than the links composed of free-turning bars 3. The bars 3 immediately adjacent to each other are so far as possible set in pairs, each pair on a common joining bushing 4.

All the tension link bars exhibit recesses 5 for the reception of rollers 6, of which two are in contact with each other in each link of the chain. The substantially rectangular recesses 5 are provided at the ends of their long sides with comparatively large rounded cut-outs 7, while the rollers 6 have their edges only slightly rounded at 8.

The inner longitudinal strips 9 of the tension link bars are narrower than the outer longitudinal strips 10.

In Figures 2 and 3, parts of the conical sheaves 11 are drawn in, between which the rollers 6 bind and thus transmit the lateral pressure to each other. In Figure 5, the relative positions of two links of the chain are shown between the conical sheaves. The conical sheaves 11 and the rollers 6 touch each other in ellipse-like surfaces 12. The positioning of the rollers 6 and of the connection bolts 1 in the link is so chosen that the plane E—E passing through the axes of the two bolts of each link cuts the surfaces 12. If in Figure 5 the link 23 of the chain is already setting firmly between the conical sheaves, then when rotation takes place in the direction of the arrow 24 the next following link 22 arriving from the left will swing, when wedging itself between the conical sheaves, about the bolt 21 which has already been fixed in position by the link 23, and describes a short circular arc whose direction coincides exactly with the radial direction 25 and is perpendicular to the axes of the rollers. Accordingly the rollers 6 execute on the conical sheaves a pure rolling motion without any sliding, so that a minimum of friction is produced.

I claim:

1. A chain including a plurality of link assemblies each including a pair of pintle pins and a plurality of fixed link plates spaced along, apertured to engage, and held against rotation on the pintle pins, a plurality of bearing bushings rotatably mounted on the pintle pins, between the fixed plates, a plurality of floating link plates, apertured to engage, and held against rotation on the bushings joining the link assemblies, the link plates having aligned apertures intermediate their ends, rollers socketed within said apertures in edge to edge contact, one roller extending beyond each side of the link assemblies and adapted to engage the opposed walls of a generally V-shaped slot in which the chain can travel.

2. A chain including a plurality of link assemblies each including a pair of pintle pins and a plurality of fixed link plates spaced along, apertured to engage, and held against rotation on the pintle pins, a plurality of bearing bushings rotatably mounted on the pintle pins, between the fixed plates, a plurality of floating link plates, apertured to engage, and held against rotation on the bushings, joining the link assemblies, the total thickness of the floating plates measured in a direction parallel with the axes of the pintle pins being greater than that of the fixed plates, the link plates having aligned apertures intermediate their ends, rollers socketed within said apertures in edge to edge contact, one roller extending beyond each side of the link assemblies and adapted to engage the opposed walls of a generally V-shaped slot in which the chain can travel.

3. A chain including a plurality of link assemblies each including a pair of pintle pins and a plurality of fixed link plates spaced along, apertured to engage, and held against rotation on the pintle pins, a plurality of bearing bushings rotatably mounted on the pintle pins, between the fixed plates, a plurality of floating link plates, apertured to engage, and held against rotation on the bushings joining the link assemblies, the total cross sectional area of the fixed plates where they are intersected by a plane containing the axes of two adjacent pintle pins being substantially equal to the total cross sectional area of all of the floating plates where they are intersected by a plane containing the axes of two adjacent pintle pins, the link plates having aligned apertures intermediate their ends, rollers socketed within said apertures in edge to edge contact, one roller extending beyond each side of the link assemblies and adapted to engage the opposed walls of a generally V-shaped slot in which the chain can travel.

4. In combination, a pair of opposed conical pulley members, a chain adapted to travel in the V-shaped slot between their opposed faces, the chain including a plurality of apertured link plates, pintle pins joining them, rollers socketed in the aligned apertures in the link plates associated with each pair of pintle pins, the rollers engaging one another in edge to edge contact, one roller projecting beyond the chain on each side to engage the opposed pulley faces, the pins and rollers being so located with respect to each other that a plane containing any pair of pintle pins intersects the areas of contact between the rollers and their opposed pulley faces.

5. In combination, a pair of opposed conical pulley members, a chain adapted to travel in the V-shaped slot between their opposed faces, the chain including a plurality of apertured link plates, pintle pins joining them, rollers socketed in the aligned apertures in the link plates associated with each pair of pintle pins, the rollers engaging one another in edge to edge contact, one roller projecting beyond the chain on each side to engage the opposed pulley faces, the pins and rollers being so located with respect to each other that a plane containing any pair of pintle pins intersects the areas of contact between the rollers and their opposed pulley faces, said plane being parallel with but spaced from the plane containing the axes of the two rollers.

6. In combination, a pair of opposed pulley members having inwardly inclined faces defining a generally V-shaped slot, a chain including a plurality of apertured link plates, pintle pins joining them, rollers socketed in aligned apertures in the link plates associated with each pair of pintle pins, the rollers engaging one another in edge to edge contact, one roller projecting beyond the chain on each side and adapted to engage the opposed walls of the generally V-shaped slot formed by the two opposed pulley faces, the pins and rollers being so located with respect to each other than a plane containing any pair of pintle pins intersects the areas of contact between the rollers and the opposed slot walls.

7. In combination, a pair of opposed pulley members having inwardly inclined faces defining a generally V-shaped slot, a chain including a plurality of apertured link plates, pintle pins joining them, rollers socketed in aligned apertures in the link plates associated with each pair of pintle pins, the rollers engaging one another in edge to edge contact, one roller projecting beyond the chain on each side and adapted to engage the opposed walls of the generally V-shaped slot formed by the two opposed pulley faces, the pins and rollers being so located with respect to each other that a plane containing any pair of pintle pins intersects the areas of contact between the rollers and the opposed slot walls, said plane being parallel with but spaced from the plane containing the axes of the two rollers.

8. In a power transmission chain, a plurality of articulated, apertured links, a plurality of rollers engaged edge to edge and socketed in the aperture in each link, a plurality of rollers, one of them projecting laterally beyond each side of the link, the projection of the axes of the rollers on the plane of the link axes being substantially perpendicular to said link axes, a plurality of members having inclined friction surfaces between which the chain travels, the axes of articulation and the contact area between the friction surfaces and the rollers being in the same plane.

ALBRECHT MAURER.